Aug. 26, 1958 A. I. TRANK ET AL 2,849,203

TELEPHONE DIAL TIMEPIECE AND MOUNTING THEREFOR

Filed June 13, 1955

A. IRVING TRANK
LEONARD TRANK
SAMUEL TRANK
INVENTORS.

BY [signature]
ATTORNEY.

United States Patent Office 2,849,203

Patented Aug. 26, 1958

2,849,203

TELEPHONE DIAL TIMEPIECE AND MOUNTING THEREFOR

Adolph Irving Trank, Downey, and Leonard Trank and Samuel Trank, Los Angeles, Calif.

Application June 13, 1955, Serial No. 514,975

1 Claim. (Cl. 248—115)

Figure 1:
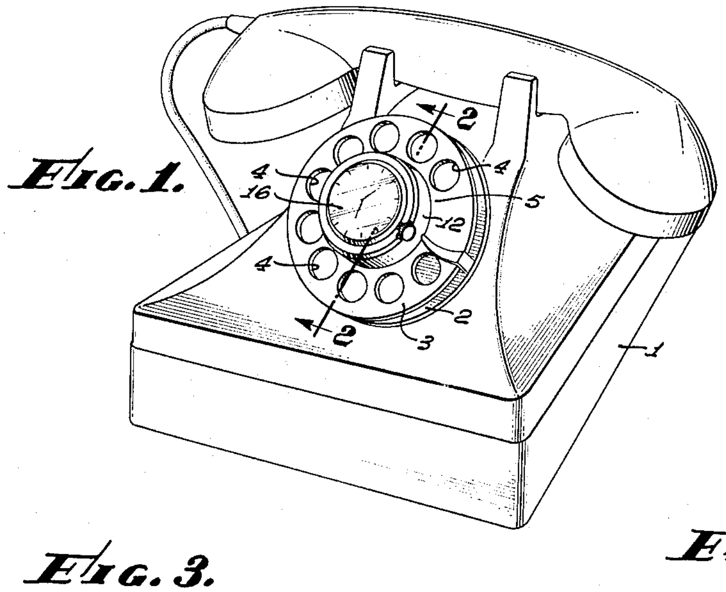

The present invention relates to a mounting for watches which permits the watch to be secured to a telephone dial. Such a device is of use in offices where incoming and outgoing telephone calls are recorded as to the time of said calls. It is also of use in determining time for long distance calls, or for keeping a record of conferences made by telephone, and the time involved.

An object of the invention is the provision of a device so constructed and arranged as to be readily secured to a telephone dial without in any manner reconstructing any portion of the dial, and which allows its incorporation on the dials of all standard type automatic telephones now generally in use throughout the United States and elsewhere.

At the present time, it is the universal practice on dial telephones, particularly of the table type, to provide a detachable ring in the center of the dial which secures a card bearing the telephone number. The present invention makes use of the ring already incorporated in the telephone in the securing of the present invention to the dial and without the necessity of removing the ring, the present device being applied over the ring. Thus, it is that installation of the present device of the invention is easy of accomplishment.

Other objects include a device of the character stated which is attractive in appearance, inexpensive, and which has great usefulness.

Figures 2, 3, 4:
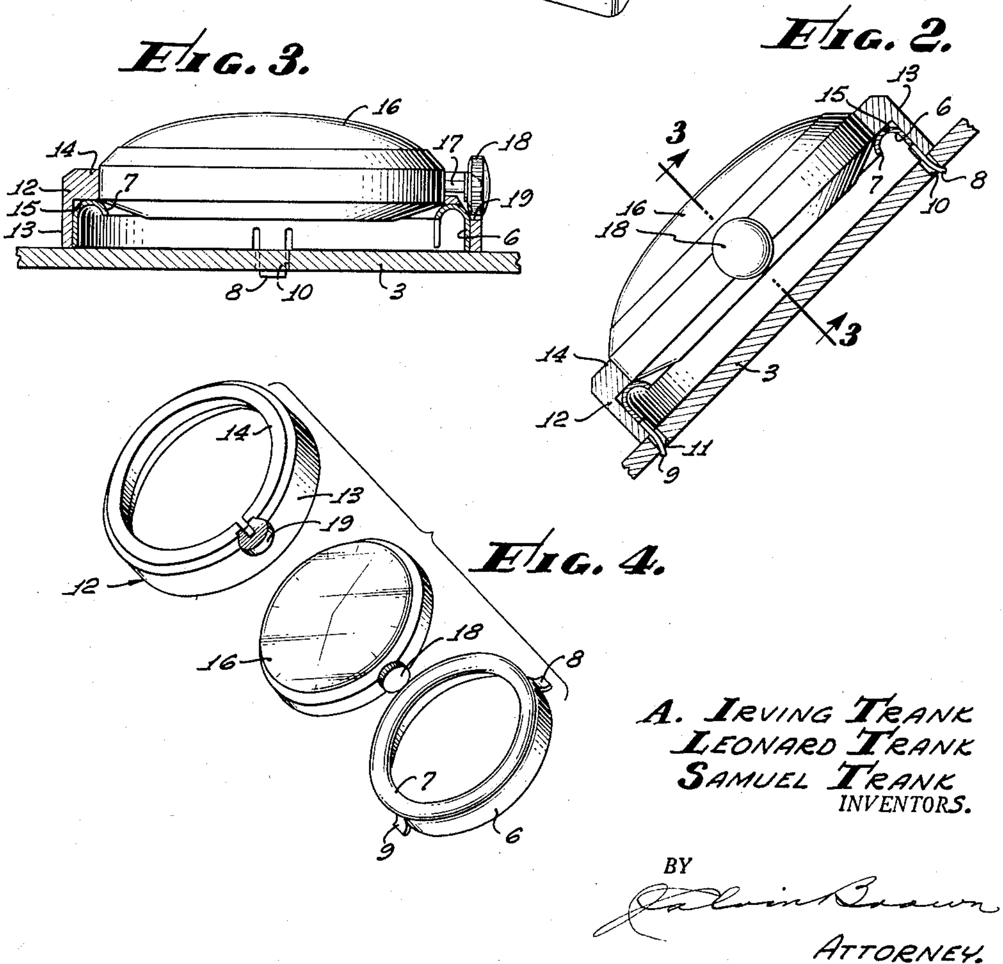

In the drawing:

Figure 1 is a perspective view of a dial type telephone with the invention applied to the dial, Figure 2 is a fragmentary sectional view on an enlarged scale, taken on the line 2—2 of Figure 1, Figure 3 is a sectional view on the line 3—3 of Figure 2, and, Figure 4 is a detached view of several elements incorporated in the invention.

Referring now with particularity to the drawing, we have shown at 1 a dial type automatic telephone, such as universally used by subscribers, and which has a numbered dial at 2 and a movable dial plate 3, having finger openings 4 whereby the dial plate may be rotated. The central portion 5 of the dial plate usually carries a card having thereon the number of the particular telephone. This number card is held within a ring 6 by means of a disc and a split clamp ring. The said disc and split clamp ring are not detailed in the drawing as this is standard practice for dial telephones. As shown, the ring 6 is provided with a curved top annular flange 7, and the side wall of said ring is provided with a diametric pair of outstanding lugs 8 and 9 adapted to be received in slots 10 and 11 of the dial plate 3. The ring 6 is utilized in the practice of our invention. We provide a ring 12 having a curved side wall 13 and an internal top flange

14. The internal diameter of the side wall 13 closely approximates the external diameter of ring 6, and is adapted to have a press-fit engagement with said ring 6. The curved flange 7 of ring 6 rests against the bottom surface 15 of the flange 14, while the bottom edge of the side wall 13 is in engagement with the dial plate 3, as shown in Figure 2. The arrangement is such that the width of the flange 14 is less than the width of the curved flange 7.

A watch 16 is adapted to be received within the confines of the flange 14 and to have a pressed-fit engagement with said flange, the watch being limited as to inward movement by the curved flange 7 of ring 6. The watch is provided with a stem 17 carrying a crown 18, and to accommodate the stem and the crown, a portion of the flange 14 and side wall 13 is formed with a depression or concavity 19 so that the stem and the crown may be received therein, as shown in Figure 3. If the watch is of the self-winding type, then the stem and crown simply function to adjust the hands of the watch; otherwise they may function for the purpose of winding the watch.

In certain adaptations of our invention, the ring 12 may form an integral part of the watch casing, although, in the present illustration of our invention, the watch casing and ring are shown as separable.

The operation, uses and advantages of our invention are as follows:

Whatever type of watch is used, whether of the self-winding or winding type, to assembly the device, the ring 12 is passed over ring 6 so that the curved flange 7 of ring 6 engages the base of the flange 14. The watch, which has a diameter slightly less than the internal diameter of the flange 14, is then pressed inwardly of said flange so that the casing engages the curved flange 7. The stem 17 and crown 18 of the watch are so positioned as to be received in the concavity 19.

Nothing has been changed on the telephone and the ring 6, which houses the number card, has not been disturbed. If a self-winding watch is used, it is obvious that rotation of the dial plate 3 will keep the watch wound.

We claim:

A support for a watch case, including a ring adapted to spacedly surround the said case, said ring provided at one end with an internal flange having a depth substantially equal to the width of the peripheral side edge of said case, the said case and the said flange being in press-fit engagement, a second ring positioned beneath the said annular flange of the first ring and in press-fit engagement with the first ring, said second ring formed with an inwardly directed curved annular flange extending beyond the inner edge of the flange of the first ring and tangent to the base surface thereof for engagement with the watch case to hold the said case against movement in one direction.

References Cited in the file of this patent

UNITED STATES PATENTS

| | | |
|---|---|---|
| 1,158,448 | Coolidge | Nov. 2, 1915 |
| 1,307,053 | Kees et al. | June 17, 1919 |
| 1,906,628 | La Hodney | May 2, 1933 |
| 2,032,414 | Helbein | Mar. 13, 1936 |
| 2,129,876 | Rumbold | Sept. 13, 1938 |
| 2,390,357 | Disken | Dec. 14, 1945 |